United States Patent
Gutierrez Medina (10) Patent No.: US 11,906,433 B2
(45) Date of Patent: Feb. 20, 2024

(54) SYSTEM AND METHOD FOR THREE-DIMENSIONAL IMAGING OF UNSTAINED SAMPLES USING BRIGHT FIELD MICROSCOPY

(71) Applicant: Instituto Potosino de Investigación Científica y Tecnológica A.C., San Luis Potosí (MX)

(72) Inventor: Braulio Gutierrez Medina, San Luis Potosi (MX)

(73) Assignee: Instituto Potosino de Investigación Científica y Tecnológica A.C., San Luis Potosi (MX)

(*) Notice: Subject to any disclaimer, the term of this patent is extended or adjusted under 35 U.S.C. 154(b) by 113 days.

(21) Appl. No.: 17/550,797

(22) Filed: Dec. 14, 2021

(65) Prior Publication Data

US 2023/0184683 A1    Jun. 15, 2023

(51) Int. Cl.
*G01N 21/64* (2006.01)
*G02B 21/16* (2006.01)
*G02B 21/06* (2006.01)

(52) U.S. Cl.
CPC ......... *G01N 21/6458* (2013.01); *G02B 21/06* (2013.01); *G02B 21/16* (2013.01)

(58) Field of Classification Search
CPC ..... G01N 21/6458; G02B 21/06; G02B 21/16
See application file for complete search history.

(56) References Cited

U.S. PATENT DOCUMENTS

| | | | | |
|---|---|---|---|---|
| 5,671,085 A | * | 9/1997 | Gustafsson | G02B 21/22 359/383 |
| 6,716,588 B2 | * | 4/2004 | Sammak | G06V 20/69 436/63 |

(Continued)

OTHER PUBLICATIONS

Sanderson, J. (2020). Fundamentals of microscopy. Current Protocols in Mouse Biology, 10, e76. doi: 10.1002/cpmo.76 (Year: 2020).*

(Continued)

*Primary Examiner* — David P Porta
*Assistant Examiner* — Djura Malevic
(74) *Attorney, Agent, or Firm* — Defillo & Associates, Inc; Evelyn A. Defillo (57) ABSTRACT

A system and method for optical sectioning in bright field microscopy (OSBM). The system includes a bright field optical microscope having automated change of focus, a substage condenser fitted with an adjustable aperture iris diaphragm, a digital camera that records the microscope image of samples, and one or more digital computers to perform digital image processing. The OSBM method comprises operating the microscope to Kohler illumination, using the iris diaphragm of the condenser to generate contrast in images, acquiring a Z-stack of images of the unstained sample, and applying a sequence of digital image processing filters to the Z-stack, resulting in optical sections from where the final three-dimensional (3D) image of the sample can be reconstructed by computational device. The final 3D images produced by this invention present quality comparable to that of available optical sectioning techniques that require sample labeling, such as light sheet fluorescence microscopy.

10 Claims, 5 Drawing Sheets

(56) References Cited

U.S. PATENT DOCUMENTS

| | | | | |
|---|---|---|---|---|
| 8,744,164 | B2* | 6/2014 | Ozinsky | G01N 21/6458 |
| | | | | 382/128 |
| 9,558,393 | B2* | 1/2017 | Ichitani | G06V 20/695 |
| 9,767,343 | B1* | 9/2017 | Jones | G01N 33/4915 |
| 10,621,704 | B2* | 4/2020 | Gutiérrez Medina | G06T 5/003 |
| 10,625,259 | B1* | 4/2020 | Jones | B01L 3/502761 |
| 10,769,771 | B2* | 9/2020 | Ferrari | A01B 76/00 |
| 10,841,507 | B2* | 11/2020 | Schürf | H04N 23/743 |
| 10,885,631 | B2* | 1/2021 | Jackson | G06T 7/136 |
| 11,047,845 | B1* | 6/2021 | Barry, Jr. | G01N 33/49 |
| 11,227,386 | B2* | 1/2022 | El-Zehiry | G06T 7/0012 |
| 11,480,778 | B2* | 10/2022 | Jones | G01N 1/38 |
| 2008/0240613 | A1* | 10/2008 | Dietz | G02B 21/365 |
| | | | | 382/284 |
| 2010/0074486 | A1* | 3/2010 | Broser | G06T 5/50 |
| | | | | 382/128 |
| 2011/0254943 | A1* | 10/2011 | Ozinsky | G01N 21/6458 |
| | | | | 382/133 |
| 2012/0013727 | A1* | 1/2012 | Breniman | G06V 20/693 |
| | | | | 348/E5.045 |
| 2017/0052106 | A1* | 2/2017 | Hennig | G01N 15/1475 |
| 2018/0045622 | A1* | 2/2018 | Deisseroth | G06V 20/695 |
| 2019/0180420 | A1* | 6/2019 | Gutiérrez Medina | G06T 5/50 |
| 2020/0250822 | A1* | 8/2020 | Jackson | G06T 7/0014 |
| 2021/0089750 | A1* | 3/2021 | Jackson | G06T 7/11 |

OTHER PUBLICATIONS

J. Mertz. "Optical sectioning microscopy". Nat Methods 2, 920-931 (2005) by Conchello, JA., Lichtman, J., or in "Introduction to Optical Microscopy". 2nd Ed. (Cambridge University Press: New York, 2011).

Fujimoto. J.G., et al. 2000, "Optical Coherence Tomography: An Emerging Technology for Biomedical Imaging and Optical Biopsy" Neoplasia, 2, 9-25.

Popescu, G. "Quantitative Phase Imaging of Cells and Tissues" McGraw-Hill: New York, 2011.

Wang, S. et al. 2011, "Spatial light interference tomography (SLIT)" Opt. Express 19, 19907-19918.

Mertz, J. "Introduction to Optical Microscopy". 2nd Ed. Cambridge University Press: New York, 2011.

Hernández Candia, C.N., Gutiérrez-Medina, B. "Direct imaging of phase objects enables conventional deconvolution in bright field light microscopy". PLoS ONE 9, e89106 (2014.

Gutiérrez-Medina, B., Sánchez Miranda, M.J. "Quantitative image restoration in bright field optical microscopy". Biophys. J. 113, 1916-1919 (2017).

Sharpe, J. et al. 2002 "Optical Projection Tomography as a Tool for 3D Microscopy and Gene Expression Studies". Science 296, 541-545.

Calisesi, G. et al. 2020, "Three-dimensional bright-field microscopy with isotropic resolution based on multi-view acquisition and image fusion reconstruction". Scl. Rep. 10, 12771.

Ounkomol, C. et al. 2018, "Label-free prediction of three-dimensional fluorescence images from transmitted-light microscopy". Nat. Methods 15, 917-920.

Christiansen, E. M. et al. 2018, "In Silico Labeling: Predicting Fluorescent Labels in Unlabeled Images". Cell 173, 792-803.e19.

Gonzalez, R.C., Woods, R.E. "Digital Image Processing" 4th Ed. (Pearson: Essex, 2018).

Stagaman, G., and Forsyth, J.M. 1988, "Bright-field microscopy of semitransparent objects" J. Opt. Soc. Am. A. 5, 648-659.

Stelzer, E. H. K. (2014) "Light-sheet fluorescence microscopy for quantitative biology". Nat Methods 12:23-26.

Gutiérrez-Medina, B., Vázquez Villa, A. "Visualizing three-dimensional fungal growth using light sheet fluorescence microscopy". Fung. Genet. Biol. 150, 103549 (2021).

Schindelin, J., Arganda-Carreras, I., Frise, E. et al. "Fiji: an open-source platform for biological-image analysis". Nat Methods 9, 676-682 (2012).

Martínez-Lorenzana, G., et al. "CLARITY with neuronal tracing and immunofluorescence to study the somatosensory system in rats". J. Neurosci. Methods 350, 109048 (2021).

* cited by examiner

SYSTEM AND METHOD FOR THREE-DIMENSIONAL IMAGING OF UNSTAINED SAMPLES USING BRIGHT FIELD MICROSCOPY

FIELD OF THE INVENTION

The herein invention is related to three-dimensional imaging of unstained samples using bright field optical microscopes.

BACKGROUND OF THE INVENTION

Optical sectioning microscopy consists in imaging thin slices of a thick specimen by removal of out-of-focus background in each image plane. The collection of images produced by optical sectioning microscopy constitutes a stack of images that is combined using computational means to produce a reconstructed three-dimensional (3D) image of the specimen. Such microscopy methods exist and are for example described in "Optical sectioning microscopy". Nat Methods 2, 920-931 (2005) by Conchello, J.A., Lichtman, J., or in "Introduction to Optical Microscopy". 2nd Ed. (Cambridge University Press: New York, 2011) by J. Mertz. Some of available optical sectioning methods detect fluorescence to image the sample, as in Confocal Laser Scanning Microscopy (CLSM) or Light Sheet Fluorescence Microscopy (LSFM). Some of the drawbacks of CLSM and LSFM are photobleaching of fluorophores and photodamage to the specimen, both induced by the high-intensity laser source used for excitation of fluorophores.

Alternatively, some available optical sectioning microscopy techniques image unstained specimens (that is, free of stains or fluorophores) for example in optical coherence tomography (OCT) or quantitative phase imaging (QPI). OCT is an optical imaging technique that measures backscattered light from the sample by means of optical interferometry and is typically used to perform cross-sectional tomographic imaging of the internal microstructure of materials and biomaterials (Fujimoto. J. G., et al. 2000, "Optical Coherence Tomography: An Emerging Technology for Biomedical Imaging and Optical Biopsy" Neoplasia, 2, 9-25). QPI is an optical interferometric technique aimed at studying weakly scattering and absorbing specimens, that measures the refractive index distribution of a sample and has optical sectioning capabilities (Popescu, G. "Quantitative Phase Imaging of Cells and Tissues" McGraw-Hill: New York, 2011). Some drawbacks of the OCT and QPI techniques are the required use of specialized interferometric instrumentation, and the required specialized alignment of interferometric instrumentation. A further drawback of QPI is the requirement of a model that relates the measured optical field with a 3D convolution operation of the electric susceptibility of the sample and the instrument response (Wang, S. et al. 2011, "Spatial light interference tomography (SLIT)" Opt. Express 19, 19907-19918).

Figure 1:
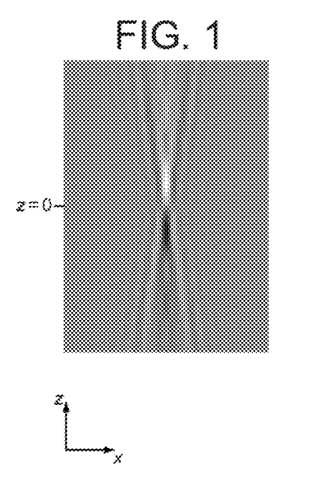
FIG. 1 shows a central XZ section image of the bright field phase point spread function is shown. Computed using Eq. (1) in (Gutiérrez-Medina, B., Sánchez Miranda, M. J. 2017, "Quantitative image restoration in bright field optical microscopy" Biophys. J. 113, 1916-1919) with the following parameters: $\lambda=450$ nm, $n=1.0$, $(NA)_{objective}=0.1$. Field of view (X-Z): 90 μm×404 μm.

One indispensable tool in any biological or biomedical laboratory is the classic bright field (BF) microscope, which is routinely used to produce two-dimensional images of stained samples. In the absence of staining, however, it is well known that BF images of optically thin objects display little contrast. Under Kohler illumination, BF microscopy cannot achieve exact in-focus (z=0, z is axial sample position with respect to focus) observation of optically thin specimens (Mertz, J. "Introduction to Optical Microscopy". 2nd Ed. Cambridge University Press: New York, 2011). The BF phase point spread function (pPSF) illustrates this behavior (see FIG. 1) (Hernández Candia, C. N., Gutiérrez-Medina, B. "Direct imaging of phase objects enables conventional deconvolution in bright field light microscopy". PLoS ONE 9, e89106 (2014); Gutiérrez-Medina, B., Sánchez Miranda, M. J. "Quantitative image restoration in bright field optical microscopy". Biophys. J. 113, 1916-1919 (2017)).

Imaging modalities have been developed to image unstained specimens in two dimensions using transmitted light microscopy (Mertz, J. "Introduction to Optical Microscopy". 2nd Ed. Cambridge University Press: New York, 2011), and some of these modalities are now widespread (e.g. Zernike phase contrast and differential interference contrast). However, BF remains attractive because of simple alignment and sample preparation, fast and inexpensive acquisition, and little induced photodamage and phototoxicity (compared to fluorescence microscopy, for example). Therefore, efforts have been made to accurately reconstruct sample images from BF recordings, with emphasis in 3D imaging (Sharpe, J. et al. 2002 "Optical Projection Tomography as a Tool for 3D Microscopy and Gene Expression Studies". Science 296, 541-545; Calisesi, G. et al. 2020, "Three-dimensional bright-field microscopy with isotropic resolution based on multi-view acquisition and image fusion reconstruction". Sci. Rep. 10, 12771; Ounkomol, C. et al. 2018, "Label-free prediction of three-dimensional fluorescence images from transmitted-light microscopy". Nat. Methods 15, 917-920; Christiansen, E. M. et al. 2018, "In Silico Labeling: Predicting Fluorescent Labels in Unlabeled Images". Cell 173, 792-803.e19). A set of strategies achieve 3D in BF by processing multiple images acquired from different angles into a single reconstruction; with the drawbacks that the process is inherently slow and image reconstruction models are required. Alternatively, recent techniques use deep learning methods to predict 3D fluorescence signal corresponding to cellular structure from BF images. The drawback of these deep learning methods is that a specialized and sometimes lengthy process of computer training is required.

BRIEF SUMMARY OF THE INVENTION

The herein invention is related to an optical sectioning in standard bright field microscopy (OSBM). The OSBM invention provides a system and method for microscopic visualization of unstained simples in three dimensions using bright field microscopy, involving the application of digital image processing filters (Gonzalez, R. C., Woods, R. E. "Digital Image Processing" 4th Ed. (Pearson: Essex, 2018)) to bright field microscopy images. The OSBM invention does not require specialized interferometric instrumentation nor theoretical modeling nor computer modeling. Therefore, the OSBM invention constitutes a fast, inexpensive, and simple alternative to known optical sectioning microscopy methods.

In an embodiment of the invention, the system includes an optical microscope having automated change of focus, a substage condenser fitted with an adjustable aperture iris diaphragm, a digital camera that records the image of the said samples created by the microscope, and one or more digital computers that store the images produced by said camera and which are used to apply digital filters to the said images.

In said embodiment an unstained sample contained in an optically transparent holder, microchamber or cuvette is situated in the specimen plane of said optical microscope.

In said embodiment of the invention, said microscope is configured to operate in bright field mode and configured to operate under Kohler illumination.

In a further embodiment the aperture of said condenser iris diaphragm is adjusted to optimize image contrast in the images of said unstained sample acquired by said camera.

The coherence parameter in bright field microscopy ($\sigma$) is the ratio of the numerical aperture (NA) of the condenser to that of the objective: $\sigma=(NA)_{condenser}/(NA)_{objective}$. The regime $\sigma \leq 0.30$ provides nearly coherent illumination at the object, as described for example by Stagaman, G., and Forsyth, J. M. 1988, "Bright-field microscopy of semitransparent objects" J. Opt. Soc. Am. A. 5, 648-659.

In some embodiments the aperture of said condenser iris diaphragm is adjusted such that the microscope illumination is in the coherent regime.

In a further embodiment of the invention, the method comprises: acquiring a Z-stack of raw images of said unstained sample by automatically changing focus and acquiring images at each focal plane using said digital camera; and using said computer or computers to apply a sequence of digital image processing filters to said Z-stack of raw images. Is an embodiment that the result of the OSBM method is a stack of processed images containing optical sections of said sample, from where a final 3D image of said sample can be reconstructed using said computer or computers.

In some embodiments the aperture of said condenser iris diaphragm is adjusted such that image contrast is generated in the images of said unstained sample acquired by said digital camera so as to optimize the OSBM method.

In some embodiments said unstained sample comprises prokaryotic cells, eukaryotic cells, archaea cells, polymers, biological polymers, biological tissue, biofilms, transparent or semi-transparent materials, free of staining agents.

In some embodiments said unstained sample comprises prokaryotic cells, eukaryotic cells, archaea cells, polymers, biological polymers, biological tissue, biofilms, transparent or semi-transparent materials, free of fluorescent agents.

In some embodiments said unstained sample comprises prokaryotic cells, eukaryotic cells, archaea cells, polymers, biological polymers, biological tissue, biofilms, transparent or semi-transparent materials, containing staining or fluorescent agents but where these agents do not affect light transmission in bright field microscopy.

DETAILED DESCRIPTION OF THE INVENTION

The invention presented herein is related to optical bright field (BF) microscopy as an alternative to perform three-dimensional (3D) imaging of unstained samples. The herein optical sectioning in bright field microscopy method (henceforth referred to as OSBM) is based on acquiring a Z-stack of raw images using a microscope operating in bright field mode, whose illumination is adjusted to optimize image contrast, and applying a set of digital filters to the Z-stack of raw images. The procedure yields a stack of processed images corresponding to optical sections of the unstained samples from where 3D image reconstruction can be performed with a computer.

As used in this application, the term "bright field microscopy", "bright field microscope", "optical sectioning microscopy", and "optical section" have the meanings given hereinbelow.

Bright field microscopy is an optical microscopy modality where light illuminating the sample is diffracted by the sample and image contrast is generated by the interference of diffracted light by the sample with undiffracted light.

Bright field microscope is a microscope that uses bright field microscopy to perform imaging of samples and has means to implement Kohler illumination.

Optical sectioning microscopy consists in imaging thin slices of a thick specimen by removal of out-of-focus background in each image plane.

Optical section is the image of a thin slice within a thick specimen, where such image contains minimal contribution from out-of-focus background.

The general strategy of the OSBM method is to achieve optical sectioning by performing axial localization of the scattering structures comprising the unstained sample.

In the regime of coherent illumination, the BF image of a point source (FIG. 1) displays a bright to dark transition with respect to background as the axial position is scanned through focus (image contrast of the central spot changes from positive to zero to negative). Moreover, the BF image of the scattering point presents changes in intensity that extend over large axial distances away from the object. The OSBM invention considers this behavior to find the axial location of the scattering point.

The method of the present invention can be disclosed as follows:

1. Support a sample on an optically transparent surface or contain the sample inside a microchamber or cuvette or similar; and surround the sample by air or by an optically transparent liquid or solid. Said sample comprising organic or inorganic material, free of staining agents or free of fluorescent agents or containing staining and/or fluorescent agents but where these agents allow light transmission in bright field microscopy.
2. Place said sample in the specimen plane of an optical microscope having automated change of focus, a substage condenser fitted with an adjustable aperture iris diaphragm, a digital camera that records the image of said sample created by said microscope, and one or more digital computers that store the images captured by said digital camera of said sample and which are used to apply digital filters to said images. In some embodiments said digital camera having a CCD (Charged Coupled Device) or CMOS (Complementary metal-oxide-semiconductor) as the light-sensing device.
3. Configure said optical microscope to operate in bright field mode.
4. Configure said optical microscope to operate under Kohler illumination.
5. Adjust the aperture of the said condenser iris diaphragm such that illumination so that contrast is generated in the images of said unstained sample captured by said digital camera of said optical microscope.
6. Acquire a Z-stack of raw images of said unstained sample by using said automated change of focus to image a set of different planes of focus within said unlabeled sample and using said digital camera to record a bright field image of said sample at each of said different planes of focus.
7. Transfer the outputs of said camera to said computer or computers for digital storage and processing.
8. Produce a stack of optical section images of said unstained sample by applying to said Z-stack of raw images a set of digital image processing filters that reject out-of-focus background in the images of said Z-stack of raw images. In one embodiment:
   a) Apply to said Z-stack of raw images digital image processing filters that remove the low spatial frequencies contained both in "frontal view" (XY) and "side views" (YZ and XZ) of the stack. In one embodiment of this step a fast Fourier transform (FFT) bandpass filter is used. In another embodiment of this step the image stack is "resliced" to generate YZ or XZ view, the high-pass filter is applied, and the stack is "resliced" back to XY view. This filtering step removes from the image stack the structures that extend over large axial distances away from scattering points, thus contributing to achieve out-of-focus background rejection.
   b) Apply background subtraction to the resulting image stack of step (a). This filtering step produces images with uniform background.
   c) Apply a smoothing filter to the resulting image stack of step (b). This filtering step reduces noise and contributes to the axial localization of scattering structures in images.
   d) Apply pairwise frame subtraction to the resulting image stack of step (c). This filtering step reduces noise and contributes to the axial localization of scattering structures in images.
   e) Apply a White Top Hat filter in 3D whose structuring element is a Z-line. This filtering step reduces noise and contributes to the axial localization of scattering structures in images.

In one embodiment said computer or computers are used to apply said set of digital image processing filters.

In one embodiment of this method, said set of digital image processing filters are implemented using software available such as FIJI, ImageJ, MATLAB, Python, Java, C++.

In another embodiment, said set of digital image processing filters are implemented with variation in order and/or by removing some of the filters and/or by adding filters that contribute to rejection of out-of-focus background from the images in said Z-stack of raw images.

This invention can be applied to a wide variety of optically transparent or translucid samples, such as prokaryotic cells, eukaryotic cells, archaea cells, polymers, biological polymers, biological tissues, biofilms, or transparent thin layer samples. These kinds of samples are named herein as the unstained samples or as the optically thin samples and are free of staining agents or free of fluorescent agents or contain staining and/or fluorescent agents but where these agents allow light transmission through the sample in bright field microscopy.

Is an embodiment that the result of the OSBM method is a stack of processed images containing optical sections of said sample, from where the final 3D image of said sample can be reconstructed by digital means.

The present OSBM invention is a different approach to achieve optical sectioning microscopy and three-dimensional microscopy. The advantages of the OSBM method are:

The method is suitable for samples free of staining or fluorescent agents.

The method is suitable for samples that are optically transparent or partially transparent.

The method does not use high-intensity laser sources that cause photodamage to the specimen.

The method is suitable to be implemented using bright field microscopy without introducing any other optical imaging technique.

The method is suitable to be implemented in bright field microscopes.

The method does not require required use of specialized interferometric instrumentation.

The method does not require theoretical or computer modelling.

The method does not require a process of computer training.

The method achieves optical sectioning comparable to that of available optical sectioning techniques such as light sheet fluorescence microscopy, allowing the proper identification of sample morphology in 3D.

EXAMPLES

The following examples disclose the best way to practice the invention, without limiting the scope of the same. In light of this disclosure, those of skill in the art will recognize that variations, modifications or substitutions may be applied to the system of this invention, to the method of this invention, to the steps of the method, or to the sequence of steps of the method described herein without departing from the concept, spirit and scope of the invention.

Example 1: Axial Localization of Scattering Structures in BF and Application of the OSBM Method to an Unlabeled Fungal Sample In FIG. 2, FIG. 3, and FIG. 4, results of the OSBM method applied to image a living sample of the filamentous fungus *Trichoderma atroviride* are shown, together with a comparison between the OSBM results with those from the available optical sectioning microscopy method known as Light Sheet Fluorescence Microscopy.

To prepare the *Trichoderma atroviride* sample (hereafter called the fungal sample), 700 μL of Vogel's medium was left to solidify at the bottom of a polymethacrylate fluorimeter cuvette. Conidia of *Trichoderma atroviride* wild-type strain (IMI 206040) were inoculated at the surface of the medium and left to incubate during 36 h at 28° C. Next, 2 mL of liquid Vogel's medium at 1% was poured in the cuvette, over the fungal colony. After an incubation over 24 h at 28° C., the sample was taken to the BF microscope for measurements.

The microscope used is a home-made instrument (hereafter called the home-made microscope) with the dual capability of operating in BF modality or in Light Sheet Fluorescence Microscopy (LSFM) modality. The LSFM modality uses fluorescence to enable three-dimensional visualization of fluorescent samples (Stelzer, E. H. K. (2014) "Light-sheet fluorescence microscopy for quantitative biology". Nat Methods 12:23-26).

The BF modality of the microscope is used to implement the OSBM method, whereas the LSFM modality is used to validate the results of OSBM. The construction and testing of the home-made instrument have been described in detail (Gutiérrez-Medina, B., Vázquez Villa, A. "Visualizing three-dimensional fungal growth using light sheet fluorescence microscopy". Fung. Genet. Biol. 150, 103549 (2021)). In summary, the microscope comprises an illumination laser beam ($\lambda$=488 nm) focused onto the sample by a 4×/0.13 (magnification/numerical aperture) microscope objective (N4X-PF, Nikon).

The laser beam is scanned using twin galvanometric mirrors and shaped using telescope and scanning lenses, such that a light-sheet 5.6-μm thick (twice the beam waist, $2\omega_0$) and 100-μm deep (twice the Rayleigh length) is formed at the sample plane. The detection arm is formed by a 10×/0.28 long-working distance (LWD=34 mm) microscope objective (MY10X-803, Mitutoyo), a GFP 525/39 emission filter (MF525-39 Thorlabs), a tube lens TL2 (TTL200, Thorlabs) and a sCMOS camera (OrcaFlash 4.0-LT, Hamamatsu).

An 800-μm travel range piezo electric stage (P-628.1CD, PI) displaces the detection objective axially, concomitantly with the light sheet. Instrument control is achieved using a multifunction data acquisition system (DAQ) (USB-6341, National Instruments) operated by a dual Xeon gold 5122 (3.60 GHz) workstation (Precision 7920, Dell). Automated control and acquisition are achieved by custom-made routines developed in LabView (National Instruments).

The BF arm of the home-made microscope consists of a high-power light emitting diode (LED) illumination source ($\lambda$=445 nm, SOLIS-445C, Thorlabs), followed by a collector lens (f=60 mm) and a LWD air condenser lens (0.78 NA, CSC2001, Thorlabs), all mounted on a rigid microscope body (CFB1500, Thorlabs). To provide space for sample manipulation, a 2f relay lens was used to image the condenser illumination plane onto the specimen plane.

A sample of *Trichoderma atroviride* was placed in the home-made microscope, the BF modality of the microscope was aligned to Kohler illumination, and the condenser diaphragm was adjusted to limit the numerical aperture of the condenser to $(NA)_{condenser}$=A Z-stack of images was acquired using parameters: 200 ms exposure time, 4 μm z-step, 260 frames in the stack. Images were acquired at 16-bit depth, 2048×2048 px$^2$, and LED illumination intensity was adjusted such that background counts in images were ~40,000 counts. Acquired images were stored in the computer operating the microscope for off-line processing.

To apply digital image processing filters on the acquired BF Z-stack of images, the software FIJI (Schindelin, J., Arganda-Carreras, I., Frise, E. et al. "Fiji: an open-source platform for biological-image analysis". Nat Methods 9, 676-682 (2012)) was used. Custom-made functions called "macros" and available procedures called "plugins" within FIJI were used. The following image processing steps were implemented in sequence:

STEP 1. The Bandpass Filter plugin with parameters (filter_large=1 px; filter_small=0 px) was applied to each x-y image of the Z-stack, yielding the image stack called $I_{FFT\,xy}$.

The Reslice plugin was applied to image stack $I_{FFT\,xy}$, from top and left, resulting in image stacks $I_{FFT\,xy\text{-}xz}$ and $I_{FFT\,xy\text{-}yz}$, respectively. The Bandpass Filter plugin with parameters (filter_large=1 px; filter_small=0 px) was applied to each $I_{FFT\,xy\text{-}xz}$ and $I_{FFT\,xy\text{-}yz}$, and the resulting were resliced back (using the Reslice plugin) to X-Y views and averaged, resulting in stack called $I_1$.

STEP 2. Background subtraction was performed on a frame-by-frame basis onto stack $I_1$, by computing the mean count value of a selected region-of-interest where no sample is present and subtracting this value from all pixel-counts in the frame. The result is image stack called $I_2$.

STEP 3. The image stack $I_2$ was binned by a factor of 2 in X and Y, yielding a Z-stack of 1024×1024 px$^2$. The result is image stack called $I_3$.

STEP 4. A smoothing filter was applied to $I_3$, using the plugin Gaussian Blur 3D with parameters (x=2, y=2, z=1.5). The result is image stack called $I_4$.

STEP 5. Pairwise frame subtraction ($\Delta$=4 frames) is performed onto image stack $I_4$, by duplicating frames 5-260 and frames 1-256 of stack $I_4$ (calling the duplicates $I_{4\ 5\text{-}260}$ and $I_{4\ 1\text{-}254}$, respectively) and performing the subtraction: $I_{4\ 1\text{-}254}\text{-}I_{4\ 5\text{-}260}$. The result is image stack called $I_5$.

STEP 6. A White Top Hat filter along the z-axis is applied to image stack $I_5$, available in the plugin Morphological Filters (3D) with parameters "operation=[White Top Hat] element=Z-Line x-radius=1 y-radius=1 z-radius=2". The result is image stack called $I_6$.

STEP 7. A final filter is applied to $I_6$ to remove small particles (below an area of 40 $px^2$), helping to reduce background noise, by creating a binary mask of $I_6$ that retained image features larger than 40 $px^2$ (using the plugin Analyze Particles) in area and using this mask to filter out spots smaller than 40 $px^2$ form images of the $I_6$ stack. No further filters are applied to the resulting images. The result of the entire image processing filter process is called $I_{FINAL\text{-}FUNGUS}$.

Figure 2:
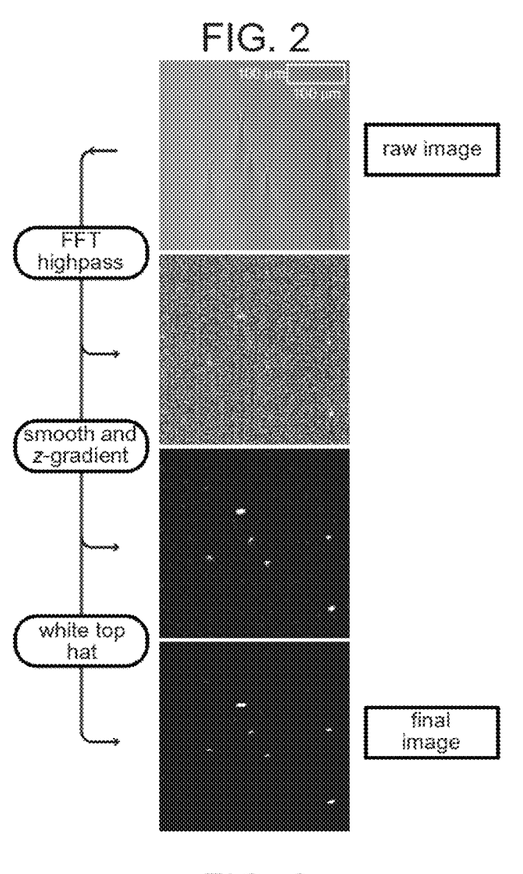
FIG. 2 shows a schematic of the set of digital image processing filters of the OSBM method (shown in rounded boxes and arrows), together with XZ images illustrating the result of each processing step for the fungal sample (described in Example 1). The raw image and final image of the OSBM method are labeled (square boxes). The OSBM method is shown to achieve excellent optical sectioning.

In FIG. 2 the results of these image processing filter steps are shown in XZ sections, demonstrating the effective removal of out-of-focus background from images and the proper axial localization of the scattering objects in images (corresponding to transversal sections of fungal hyphae).

To validate the results shown in FIG. 2, the same fungal sample was imaged using LSFM and compared with the OSBM results. A Z-stack of images was acquired employing the LSFM modality of the said home-made microscope, using the following imaging parameters: laser intensity 30 mW, exposure time 200 ms, z-step between frames 4 µm. Fungal autofluorescence was used to perform LSFM imaging.

Figure 3:
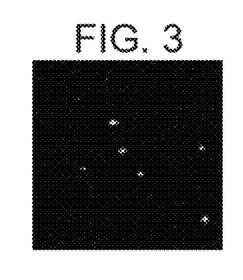
FIG. 3 shows an overlay of the final image of the OSBM method shown in the bottom image of FIG. 2 (red color) and an LSFM image (green color) of the same XZ field of view. An excellent match in the axial localization of scattering objects (fungal hyphae within the sample described in Example 1) is observed between OSBM and LSFM.

FIG. 3 shows a comparison between OSBM ($I_{FINAL\text{-}FUNGUS}$) and LSFM images in XZ sections, demonstrating the excellent match between the two. This comparison demonstrates that the OSBM method achieves optical sectioning appropriately, with characteristics that are comparable to that of state-of-the-art optical sectioning methods such as LSFM.

Figure 4A:
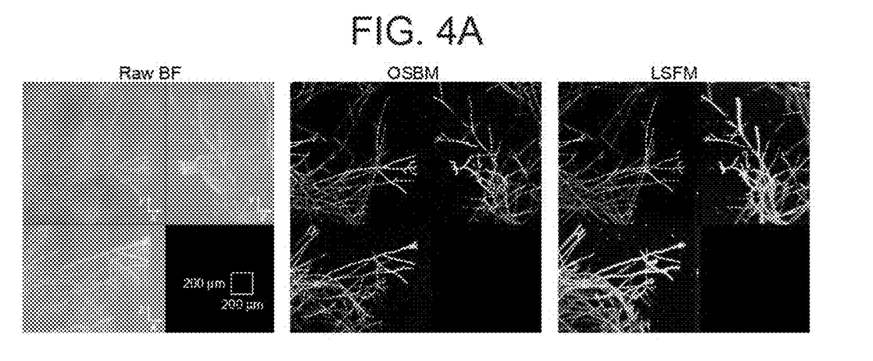
FIG. 4A shows images of the fungal sample (described in Example 1). Maximum intensity projections along XY, XZ and YZ are shown for raw bright field ("Raw BF", grayscale), the result of the OSBM method ("OSBM", false color), and light sheet fluorescence microscopy ("LSFM", false color)
Figure 4B:
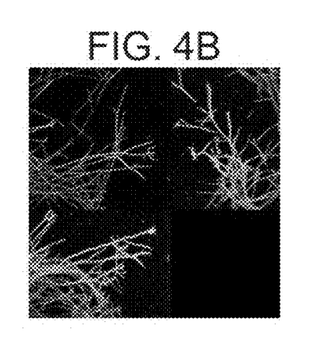
FIG. 4B shows an overlay of the OSBM (red color) and LSFM (green color) maximum intensity projection images shown in FIG. 4A. Excellent overlap is shown between the two methods.
Figure 4C:
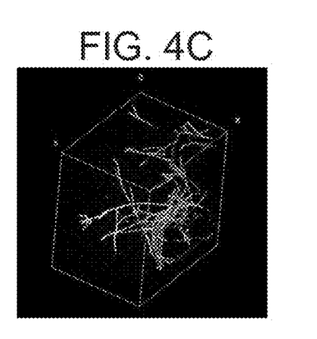
FIG. 4C shows a false-color image resulting from the OSBM method showing a three-dimensional rendering of the fungal sample (described in Example 1). Field of view: 1495×1495×1016 μm³.

In FIG. 4A the resulting image of the OSBM method ($I_{FINAL\text{-}FUNGUS}$) for the fungal sample is compared with the original image and with the autofluorescence LSFM image. In FIG. 4A maximum intensity projection (MIP) images along XY, XZ and YZ are shown. In FIG. 4B the MIP images of OSBM are overlaid with the MIP images of LSFM for the fungal sample, showing excellent overlap between the two methods. From the optical sections provided by OSBM, a 3D image of the fungal sample is provided in FIG. 4C. These results support the OSBM method as a valid technique for optical sectioning microscopy.

Example 2: Application of the OSBM Method to a Cleared Tissue Sample

Figure 5A:
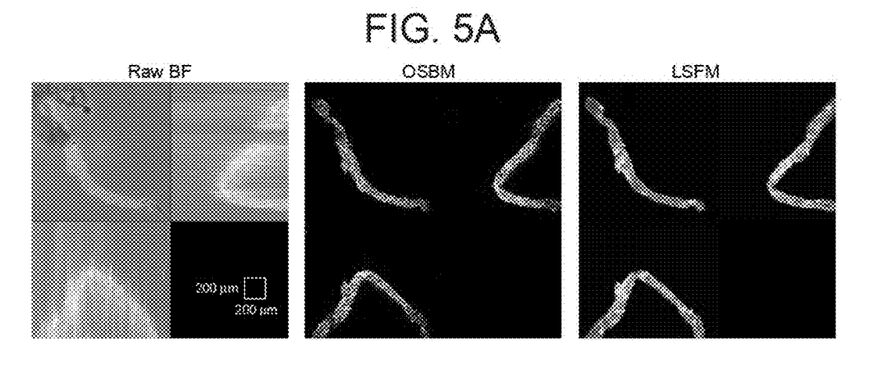
FIG. 5A shows images of the cleared tissue sample (described in Example 2). Maximum intensity projections along XY, XZ and YZ are shown for raw bright field ("Raw BF", grayscale), the result of the OSBM method ("OSBM", false color), and light sheet fluorescence microscopy ("LSFM", false color)
Figure 5B:
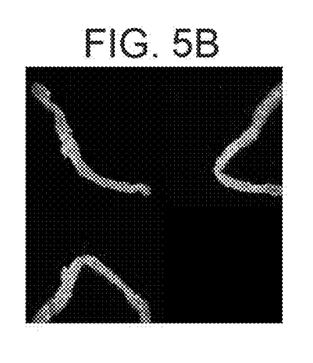
FIG. 5B shows an overlay of the OSBM (red color) and LSFM (green color) maximum intensity projection images shown in FIG. 5A. Excellent overlap is shown between the two methods.
Figure 5C:
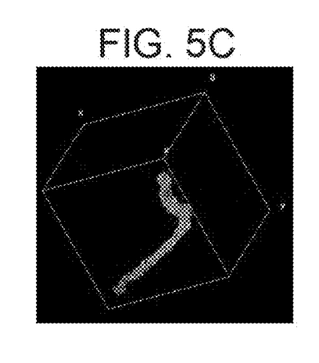
FIG. 5C shows a false-color image resulting from the OSBM method showing a three-dimensional rendering of the cleared tissue sample (described in Example 2). Field of view: 1495×1495×1128 μm³.

In FIG. 5A, FIG. 5B, and FIG. 5C, results of the OSBM method applied to image a sample of cleared tissue are shown. A section of rat spinal cord was cleared using the CLARITY technique (Martínez-Lorenzana, G., et. al. "CLARITY with neuronal tracing and immunofluorescence to study the somatosensory system in rats". J. Neurosci. Methods 350, 109048 (2021)), without introducing any labeling. Animal procedures and protocols were approved by the Institutional Ethics Committee (Institute of Neurobiology, UNAM, Mexico) and in accordance with the ethical guidelines of the IASP and the NIH. Meningeal tissue was separated from the rest of tissue and placed in 2,2' thiodiethanol (TDE) at increasing concentrations of 20%, 40% and 60%, during 24 h in each, at room temperature. Tissue was placed in a glass fluorimeter cuvette (Helima), at 60% TDE, and subject to microscopy experiments.

The said home-made microscope described in Example 1 was used for the experiment and results pertaining to Example 2.

The cleared tissue sample was placed in the home-made microscope, the BF modality of the microscope was aligned to Kohler illumination, and the condenser diaphragm was adjusted to limit the numerical aperture of the condenser to $(NA)_{condenser}$=0.05. A Z-stack of images was acquired using parameters: 200 ms exposure time, 4 µm z-step, 290 frames in the stack. Images were acquired at 16-bit depth, 1024× 1024 $px^2$, and LED illumination intensity was adjusted such that background counts in images were ~40,000 counts. Acquired images were stored in the computer operating the microscope for off-line processing.

The sequence of digital image processing filters applied to the Z-stack of BF images of the cleared tissue sample were the same as for Example 1, with the following modifications: (i) In STEP 1 the Bandpass Filter plugin was used with parameters (filter_large=2 px; filter_small=0 px); (ii) STEP 3 was not performed; (iii) In STEP 5 pairwise frame subtraction is performed by duplicating frames 6-290 and frames 1-285 of the stack resulting from STEP 4; (vi) STEP 7 was not performed. No further filters are applied to the resulting images. The result of the entire image processing filter process is called $I_{FINAL\text{-}TISSUE}$.

To validate the results of the OSBM method for the cleared tissue sample, the same tissue sample was imaged using LSFM. A Z-stack of images was acquired employing the LSFM modality of the said home-made microscope, using the following imaging parameters: laser intensity 1 mW, exposure time 200 ms, z-step between frames 4 µm. The autofluorescence of tissue was used to perform LSFM imaging.

FIG. 5A shows MIP images for the cleared tissue sample: the original BF image, the result of the OSBM method ($I_{FINAL\text{-}TISSUE}$), and the corresponding LSFM image. In FIG. 5B the MIP images of OSBM are overlaid with the MIP images of LSFM for the cleared tissue sample, showing that the shape of tissue along XY, XZ, and YZ views in OSBM overlaps with the LSFM result. From the optical sections provided by OSBM, a 3D image of the cleared tissue sample is provided in FIG. 5C. These results further demonstrate the adequate capability of the OSBM method to perform optical sectioning microscopy.

Example 3: Application of the OSBM Method to an Onion Skin Sample

Figure 6A:
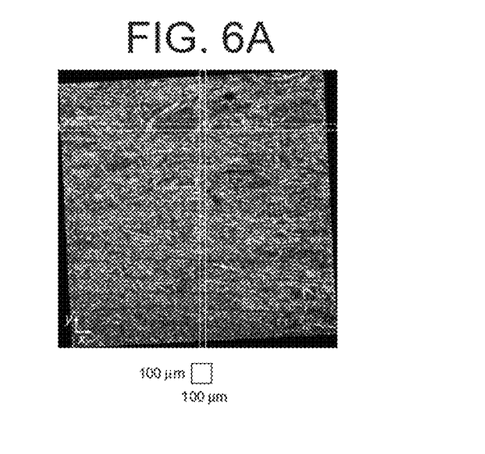
FIG. 6A shows a false-color, XY maximum intensity projection image of the OSBM result for the onion sample (described in Example 3).
Figure 6B:
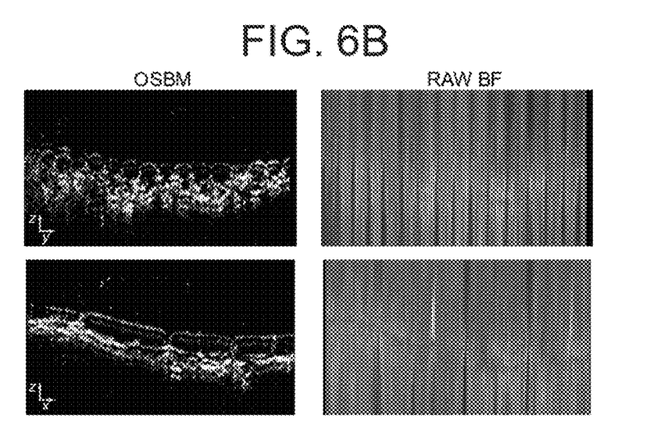
FIG. 6B shows a false-color, XZ and YZ maximum intensity projection images of the OSBM result for the onion sample (described in Example 3), corresponding to the vertical and horizontal white rectangles shown in FIG. 6A, respectively. Cell shapes of onion skin cells in both longitudinal (XZ) and transversal (YZ) views are readily identified. Shown at the right column (grayscale) are the corresponding bright field XZ and YZ maximum intensity projection images.

In FIG. 6A, FIG. 6B, and FIG. 6C results of the OSBM method applied to image a sample of fresh onion skin are shown. A common onion (*Allium cepa*) from the local grocery store was peeled, and a strip of scale epidermis was removed and immersed in distilled water ($dH_2O$) inside a plastic cuvette. Microscopy measurements were performed within the first 2 h after preparation.

The said home-made microscope described in Example 1 was used for the experiment and results pertaining to Example 3.

The unlabeled onion sample was placed in the home-made microscope, the BF modality of the microscope was aligned to Kohler illumination, and the condenser diaphragm was adjusted to limit the numerical aperture of the condenser to $(NA)_{condenser}=0.05$. A Z-stack of images was acquired using parameters: 200 ms exposure time, 4 µm z-step, 200 frames in the stack. Images were acquired at 16-bit depth, 1024×1024 $px^2$, and LED illumination intensity was adjusted such that background counts in images were ~40,000 counts. Acquired images were stored in the computer operating the microscope for off-line processing.

The sequence of digital image processing filters applied to the Z-stack of BF images of the onion sample are the same as for Example 1, with the following modifications: (i) In STEP 1 the Bandpass Filter plugin was used with parameters (filter_large=2 px; filter_small=0 px); (ii) STEP 3 was not performed; (iii) In STEP 5 pairwise frame subtraction is performed by duplicating frames 5-200 and frames 1-295 of the stack resulting from STEP 4; (vi) STEP 7 was not performed. No further filters are applied to the resulting images. The result of the entire image processing filter process is called $I_{FINAL-ONION}$.

FIG. 6A shows an XY MIP image of the OSBM result for the onion sample ($I_{FINAL-ONION}$). FIG. 6B shows XZ and YZ MIP images of the OSBM result for subsections of the onion sample, where the characteristic cell shapes of onion cells in both longitudinal (XZ) and transversal (YZ) views are readily identified; the corresponding XZ and YZ MIP images of raw BF are included to appreciate the effective removal of out-of-focus background by the OSBM method.

Example 4: Application of the OSBM Method to a Plant Root Sample

Figure 7A:
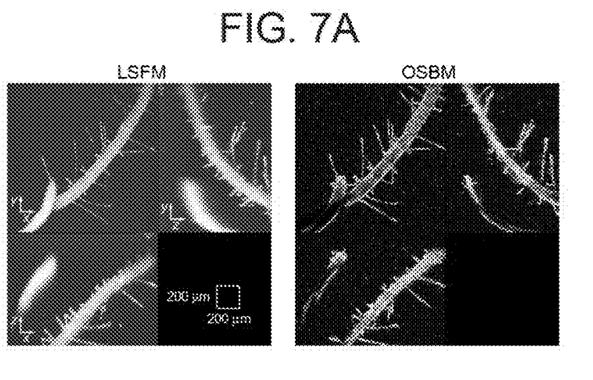
FIG. 7A shows images of the plant root sample (described in Example 4). Maximum intensity projections along XY, XZ and YZ are shown for light sheet fluorescence microscopy ("LSFM", false color) and the result of the OSBM method ("OSBM", false color).
Figure 7B:
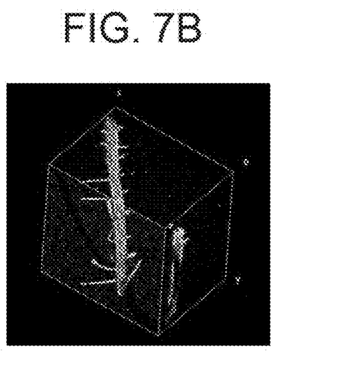
FIG. 7B shows a false-color image resulting from the OSBM method showing a three-dimensional rendering of the plant root sample (described in Example 4). Field of view: 1495×1495×1008 μm³.

The OSBM method was applied to a plant root sample, which presents significant optical opacity. In FIG. 7A and FIG. 7B results of the OSBM method applied to image a sample of *Arabidopsis thaliana* root are shown. Seeds of *Arabidopsis thaliana* (ecotype Col-0) were disinfected with 75% ethanol during 3 min under agitation, then with 20% chlorine during 7 min, and followed by 4 rinses with sterile $dH_2O$. The disinfected seeds were placed on 0.7% MS agarose plates (Murashige and Skoog medium supplemented with 1% sucrose, pH 5.7, and plant agar), and kept in the dark for 2 days at 4° C. Finally, seeds were placed to germinate at 22° C. under a 16 h light/8 h dark regime. 4-days old seedlings were removed from the agar plate and transferred to a plastic cuvette filled with $dH_2O$ for microscopy observation.

The said home-made microscope described in Example 1 was used for the experiment and results pertaining to Example 4.

The plant root sample was placed in the home-made microscope, the BF modality of the microscope was aligned to Kohler illumination, and the condenser diaphragm was adjusted to limit the numerical aperture of the condenser to $(NA)_{condenser}=0.05$. A Z-stack of images was acquired using parameters: 200 ms exposure time, 4 µm z-step, 200 frames in the stack. Images were acquired at 16-bit depth, 2048×2048 $px^2$, and LED illumination intensity was adjusted such that background counts in images were ~40,000 counts. Acquired images were stored in the computer operating the microscope for off-line processing.

The sequence of digital image processing filters applied to the Z-stack of BF images of the plant root sample are the same as for Example 1, with the following modification: STEP 7 was not performed. No further filters are applied to the resulting images. The result of the entire image processing filter process is an image stack of optical sections called $I_{FINAL-ROOT}$.

To validate the results of the OSBM method for the plant root sample, the same root sample was imaged using LSFM. A Z-stack of images was acquired employing the LSFM modality of the said home-made microscope, using the following imaging parameters: laser intensity 1 mW, exposure time 200 ms, z-step between frames 4 µm. The autofluorescence of tissue was used to perform LSFM imaging.

For the plant root sample FIG. 7A shows XY, YZ, and XZ MIP images of LSFM and the OSBM result ($I_{FINAL-ROOT}$). A comparison between LSFM and OSBM images for the plant root shows that thin root hairs and the thick root at the surface that faces the objective lens are properly imaged by OSBM in 3D, whereas the rest of the root is not visualized by OSBM due to optical opacity of the root. FIG. 7B shows a 3D rendering image for the plant sample obtained from the OSBM result ($I_{FINAL-ROOT}$), where root morphology is readily appreciated.

These results with the plant sample demonstrate that even in partially optically opaque samples OSBM achieves accurate optical sectioning of regions with good light transmission.

The invention claimed is:

1. A method for three-dimensional imaging using bright field light microscopy, the method comprising the steps of:
   a) placing an unstained sample on an optical transparent holder, surrounding the unstained sample in the transparent holder with air or an optically transparent liquid or solid, and then placing the sample in an optical microscope, the optical microscope having automated change of focus, a substage condenser fitted with an adjustable aperture iris diaphragm, a digital camera to record images of said unstained sample created by said microscope, and one or more digital computers to store and process the images of said unstained sample captured by said digital camera;
   b) operating said optical microscope in bright field mode;
   c) adjusting said optical microscope to Kohler illumination and operating said optical microscope under Kohler illumination;
   d) adjusting the aperture of said condenser iris diaphragm of said optical microscope so that contrast is generated in the images of said unstained sample captured by said digital camera of said optical microscope;
   e) acquiring a Z-stack of images of said unstained sample;
   f) transferring the outputs of said digital camera to said computer or computers;
   g) applying to said Z-stack of images a high-pass filter to remove the low spatial frequency components from images;
   h) applying a pairwise frame subtraction operation to the resulting image stack of step g);
   i) applying a smoothing filter to the resulting image stack of step h);
   j) apply a white top hat filter in three dimensions to the resulting image stack of step i); and
   k) reporting the result of step (i) in the form of digital image stacks, matrices of numbers, projection images or three-dimensional rendering images.

2. The method according to claim 1, wherein said unstained sample comprises organic or inorganic material, prokaryotic cells, eukaryotic cells, archaea cells, tissue, polymers, biological polymers, biofilms, transparent materials, or semi-transparent materials.

3. The method according to claim 1, wherein said unstained sample is free of staining agents and/or free of fluorescent agents.

4. The method according to claim 1, wherein said unstained sample contains fluorescent agents.

5. The method according to claim 1, wherein said the transparent holder is a chamber, a microchamber, a cuvette, or a vessel.

6. The method according to claim 1, wherein said Z-stack of images comprises a collection of images corresponding to different planes of focus within said unstained sample.

7. The method according to claim 1, wherein said Z-stack of images is acquired by using said automated change of focus to image a set of different planes of focus within said unlabeled sample and using said digital camera to record a bright field image of said sample at each of said different planes of focus.

8. The method according to claim 1, wherein said high-pass filter, pairwise frame subtraction filter, smoothing filter, and the white top hat filter, are applied to said Z-stack of images by said digital computer or computers.

9. An optical sectioning bright field microscopy system comprising:
- an optical transparent holder adapted to receive an unstained sample, the optical transparent holder with the unstained sample is surrounded with air or an optically transparent liquid or solid;
- an optical microscope, the optical transparent holder with the unstained sample are placed inside the optical microscope, the optical microscope having automated change of focus, a substage condenser fitted with an adjustable aperture iris diaphragm, and a digital camera, said digital camera recording the images of a sample produced by said optical microscope and having an output to provide the information contained in said images of a sample, said optical microscope configured to allow operation in bright field mode and under Kohler illumination, said optical microscope configured to allow adjustment of said iris diaphragm, said optical microscope configured to allow acquisition of Z-stacks of images of said sample by using said automated change of focus of said optical microscope to image a set of different planes of focus within said sample and using said digital camera to record a bright field image representative of each of said different planes of focus;
- one or more digital computers configured to receive the output of said digital camera and recognize said output as said Z-stacks of images of said sample, said one or more digital computers configured to apply a high-pass filter, a pairwise frame subtraction filter, a smoothing filter, and a white top hat filter to said Z-stacks of images of said sample resulting in optical section images of the said sample; and
- a reporting apparatus in communication with said one or more digital computers, said reporting apparatus configured to provide a report of said optical section images in the form of digital image stacks, matrices of pixel values, projection images or three-dimensional rendered images.

10. The optical sectioning bright field microscopy system of claim 9, wherein said adjustment of said iris diaphragm allows the generation of contrast in the images of said sample captured by said digital camera of said optical microscope.

* * * * *